Nov. 1, 1949.                R. H. REISS ET AL                    2,486,681
              FASTENING DEVICE FOR THE WAISTBAND
                      OF TROUSERS AND THE LIKE
Filed Jan. 18, 1949                                          2 Sheets-Sheet 1
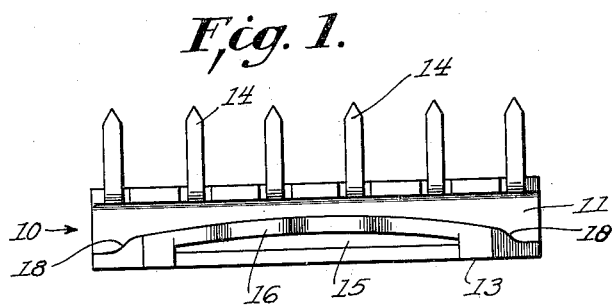
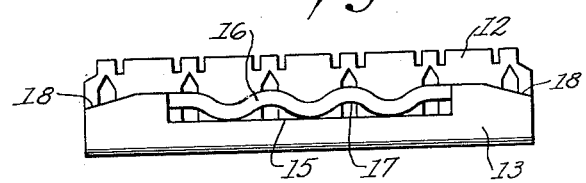
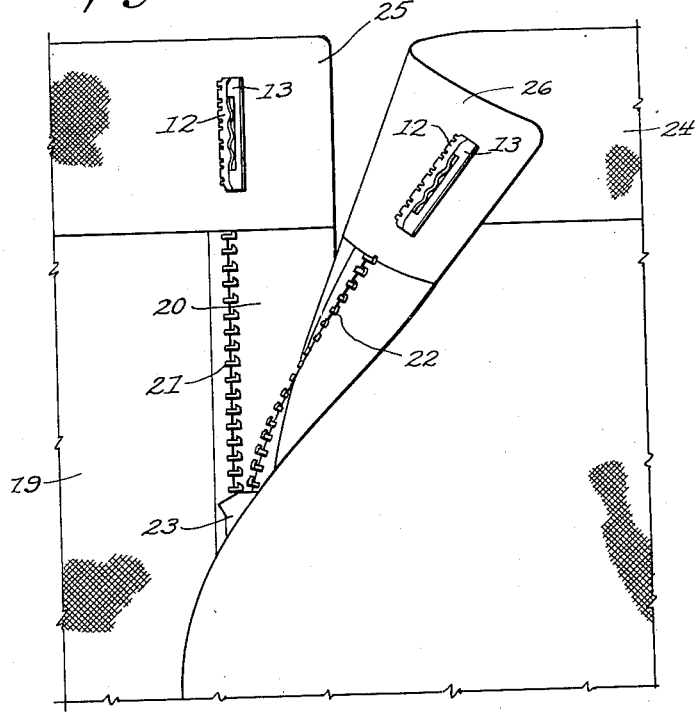
INVENTORS
Raymond H. Reiss &
Paul R. T. Hahn.
By Cushman, Darby & Cushman
Attorneys Nov. 1, 1949.
R. H. REISS ET AL
2,486,681
FASTENING DEVICE FOR THE WAISTBAND
OF TROUSERS AND THE LIKE
Filed Jan. 18, 1949
2 Sheets-Sheet 2
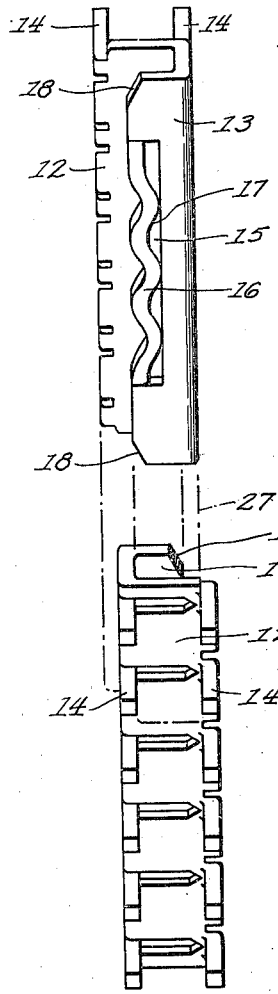
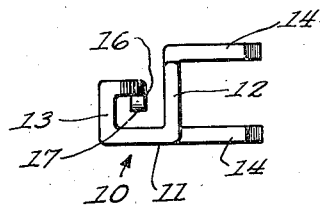
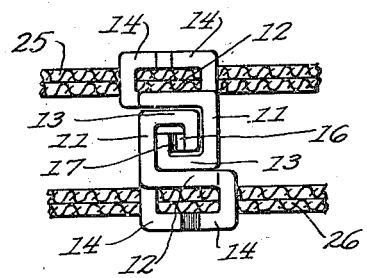
INVENTORS
Raymond H. Reiss &
Paul R. T. Hahn.
By Cushman, Darby & Cushman
Attorneys.

Patented Nov. 1, 1949

2,486,681

UNITED STATES PATENT OFFICE 2,486,681

FASTENING DEVICE FOR THE WAISTBAND OF TROUSERS AND THE LIKE

Raymond H. Reiss, New York, N. Y., and Paul R. T. Hahn, Westfield, N. J., assignors to Reiss Manufacturing Corporation, Wilmington, Del., a corporation of Delaware Application January 18, 1949, Serial No. 71,412

7 Claims. (Cl. 24—222)

This invention relates to separable fastener elements, particularly adapted for use with garments, to secure the overlapping end portions of waistbands, placket or fly openings, and the like.

It is an object of this invention to provide a separable fastener element adapted for interconnecting engagement with a like element oppositely disposed, to separably fasten fabric or like articles to which the elements are secured.

It is a further object of this invention to provide a fastener element engaged to and disengaged from a like element oppositely disposed with great facility, by endwise interconnection.

A further object is to provide a fastener element having a resilient, spring-like locking surface integrally incorporated therein, adapted to cooperate with the like surface of a like element oppositely disposed and engaged thereto in fastening relationship, to prevent unintentional displacement or disengagement of the engaged elements.

A further object is to provide a fastener element of simplified construction, readily manufactured in large numbers with a minimum of trouble and expense.

A still further object is to provide a fastener element readily attached to fabric and the like in a manner proof against inadvertent removal by washing, dry cleaning, pressing or the like, and of sturdy construction to resist damage in such processes and in use.

Other objects will be in part obvious and in part pointed out hereinafter.

The invention and the novel features thereof may best be understood from the following description and the accompanying drawings, in which:

Figure 1 is a side elevation of a preferred embodiment of the present invention;

Figure 2 is a plan view of the fastener element of Figure 1;

Figure 3 is an end elevation of the fastener element of Figure 1;

Figure 4 is an elevational view of a garment having a placket or fly opening, with fastener elements of this invention secured to the overlapping end portions of the garment adjacent the opening, in proper location for fastening engagement by endwise interconnection;

Figure 5 is an isometric view of a pair of oppositely disposed fastener elements, positioned for endwise interconnection, and Figure 6 is an enlarged horizontal section through the garment of Figure 4, showing the opening thereof closed and secured by interconnected fastener elements.

Referring to the drawings, particularly Figures 1 to 3, a preferred embodiment of the present invention comprises the elongated, substantially U-shaped channel member indicated generally as 10, composed of the bottom portion 11 and the sides 12 and 13. Side 12 is provided with suitable fabric-attaching means, preferably two spaced rows of the outwardly extending prongs 14, although it will be recognized that openings for stitching or stapling, or other suitable means to facilitate secure attachment of the element to fabric may be employed. Side 13, adjacent the outer edge thereof, is provided with the longitudinal slot 15, desirably extending a major portion of the length of side 13. As best seen in Figure 3, the outer longitudinal portion of side 13 is laterally displaced in the direction of side 12 to form the inwardly turned edge portion 16. Edge portion 16, or at least that section thereof adjoining slot 15, is shaped into corrugated or undulating form relative to the bottom portion 11, to constitute the yieldable, spring-like locking surface 17. The locking surface 17 and the section of edge portion 16 adjoining slot 15 are joined to side 13 only at the ends thereof, and, it will be seen, may be resiliently displaced in a direction away from the bottom portion 11, acting substantially as a spring relative to the ends of the channel member 10. The inwardly turned edge portion 16 desirably, but not necessarily, is also bowed outwardly in the direction of side 12, approaching most closely thereto at a point substantially central thereof, for reasons presently apparent. To ease endwise interconnection of the elements and act as guides therefor, edge portion 16 is provided with the flared ends 18, receding away from the opposite side 12 and into the ends of side 13, as shown.

In Figure 4 is shown, by way of example, a pair of trousers 19, having a fly opening 20 of conventional construction. The fly opening 20 is provided with a suitable closure, such as the rows of interfitting elements 21 and 22 and the slide 23, operable to engage and disengage the rows of interfitting elements by passage thereover, in the well known manner. At the upper end of the trousers is provided the waistband 24, and the usual overlapping ends 25 and 26 thereof.

In the past, it has been conventional practice to provide the overlapping ends of waistbands with suitable fastening devices, such as cooperating buttons and buttonholes, or large hooks and eyes. However, such fastening devices have proved troublesome and generally unsatisfactory in use, and constitute an appreciable item of cost in the manufacture of the garments. The waistbands of trousers and skirts are subjected to substantial strains in use, and to considerable abuse and frictional wear, due to repeated opening and closing of the flys or plackets thereof. In addition, buttons often become loose and eventually detached, and button holes frayed or torn. Hooks and eyes are easily bent or otherwise deformed, and have a tendency to wear out the fabric adjacent thereto in repeated use.

The present invention provides an improved fastener element particularly adapted for securing the waistbands of trousers and skirts, which overcomes all the shortcomings of the prior art. In an exemplary utilization of the present invention, each of the overlapping waistband ends is provided with a like fastener element, as above described, securely attached to the fabric as shown in Figure 4, that is, one of the elements is attached to the outer surface of the underlying end 25, and another to the inner surface of the overlying end 26. The fastener elements are securely anchored to the fabric as by the prongs 14, which extend through the fabric and are then closed thereabout, as may best be seen in Figure 6. As will be readily understood by those skilled in the art, the fabric may be strengthened at the point of attachment of the fastener element by a layer of webbing, by a strip or bar of metal or plastic, or other suitable backing element, if desired. As has already been pointed out, the fastener elements may be anchored to the fabric by other means. The prongs 14, however, have proven especially suitable for secure, permanent anchoring, and are adapted for fast, economical machine application.

As they appear in Figure 4, with the overlying end 26 of the waistband 24 turned back upon itself, the fastener elements are similarly disposed. It will be readily seen, however, that when the fly opening 20 is completely closed and the ends 25 and 26 in overlapping relationship, the fastener elements will be oppositely disposed relative to each other. The fastener elements are engaged by endwise interconnection, conveniently by lateral displacement and manipulation of the waistband ends 25 and 26 to bring the fastener elements into end to end relationship, and then into interfitting engagement of the edge portions 16 of the elements. In Figure 5 is shown the relative positioning of two opposed fastener elements adapted for engagement by endwise movement. The dotted line position 27 illustrates the position of the upper element when it has been moved downwardly into partial engagement with the lower element. Entry of the edge portions 16 of the fastener elements into interfitting relationship is facilitated, it will be readily seen, by the guiding flared ends 18 thereof. When properly positioned, the overlapping ends 25 and 26 are then manipulated laterally relative to each other, to effect lengthwise interconnection of the fastener elements. The resistance of the elements to interconnection increases with penetration, and reaches a maximum at a point representing substantially full lengthwise engagement.

In passing laterally into and through interconnection with each other, the locking surfaces 17 are brought into abutting relationship, and the abutting locking surfaces, due to their undulating form, yieldingly resist further lateral displacement relative to each other. That is, the interlocked elements tend to find a relative position corresponding to interfitting relationship of the undulations of the locking surfaces 17, and resist lateral displacement from such position, which entails passage of the high points of one locking surface over the high points of the other. Relative lateral displacement is permitted, however, by the aforementioned spring-like action of the edge portions 16, permitting, when sufficient force is applied, displacement of the edge portions 16 away from each other, whereby the locking surfaces may be moved laterally relative to each other. The bowed form of the inwardly turned edge portions 16 has been found to improve the spring-like locking characteristics of the fastener elements, particularly to contribute to the desired property of having maximum resistance to disengagement when the elements are in substantially complete lengthwise engagement. The interlocked position of the fastener elements may be seen in Figure 6.

The fastener elements, it will be seen, may be engaged and disengaged from either end. Once engaged, the elements are self-locking, as previously explained, and resist disengagement except by a direct pull of substantial force. Since the fastener elements are self-locking it is not necessary to provide stops to prevent unintentional disengagement, although, if desired, a stop may be provided to limit engagement and disengagement to a single direction.

Complete closure of the fly opening 20 by the slide 23 and the interfitting elements 21 and 22, or by buttons or other fly or placket closure means, will further assist in preventing unintentional disengagement of the fastener elements of this invention, by limiting the relative lateral movement of the overlapping ends of the waistband. However, it is to be particularly noted that the fastener elements may be engaged whether the fly or placket is open or closed, and are capable of effectively resisting disengaging forces of moderate proportions solely by the spring-like action of their engaged locking surfaces.

The fastener element of this invention is adapted for attachment to and use with woven and non-woven fabrics, wood, leather, cardboard and like materials, and it is to be understood that the term "fabric" as used throughout the specification and claims is intended to include all such materials. This invention is a modification of and improvement upon our previous invention, described in application Serial No. 712,170, filed November 25, 1946.

The invention is not limited to the exact details of construction shown in the accompanying drawings and described above, but covers all modifications coming within the scope of the appended claims and their equivalents.

We claim:

1. A self-locking separable fastener element adapted for endwise interconnection with a like element oppositely disposed, comprising a substantially rigid channel member composed of a bottom portion and two sides, one of said sides being provided with fabric-attaching means, the other of said sides having a longitudinal slot adjacent the outer edge thereof, the outer edge portion of said slotted side being turned inwardly toward said fabric-attaching side, and said inwardly turned edge portion being shaped into undulating form.

2. A self-locking separable fastener element adapted for endwise interconnection with a like element oppositely disposed, comprising an elongated, substantially rigid channel member composed of a bottom portion and two sides, one of said sides being provided with fabric-attaching means, the other of said sides having a longitudinal slot adjacent the outer edge thereof, the outer edge portion of said slotted side being turned inwardly toward said fabric-attaching side, and said inwardly turned edge portion being shaped into undulating form relative to said bottom portion.

3. A self-locking separable fastener element adapted for endwise interconnection with a like element oppositely disposed, comprising an elongated, substantially rigid channel member composed of a bottom portion and two sides, one of said sides being provided with fabric-attaching means, the other of said sides having a longitudinal slot adjacent the outer edge thereof, the outer edge portion of said slotted side being turned inwardly toward said fabric-attaching side and being flared at the ends thereof outwardly from said fabric-attaching side, and the section of said inwardly turned edge portion adjoining said slot being shaped into undulating form relative to said bottom portion.

4. A self-locking separable fastener element adapted for endwise interconnection with a similar element oppositely disposed, comprising an elongated, substantially rigid channel member composed of a bottom portion and two sides, one of said sides being provided with fabric-attaching means, the other of said sides having a longitudinal slot adjacent the outer edge thereof, the outer edge portion of said slotted side being turned inwardly toward said fabric-attaching side and being flared at the ends thereof outwardly from said fabric-securing side, the section of said inwardly turned edge portion adjoining said slot being bowed inwardly toward said fabric-attaching side and being shaped into undulating form relative to said bottom portion.

5. The invention as defined in claim 2, wherein said fabric-attaching means constitute outwardly extending prongs.

6. The invention as defined in claim 3, wherein said fabric-attaching means constitute outwardly extending prongs.

7. The invention as defined in claim 4, wherein said fabric-attaching means constitute outwardly extending prongs.

RAYMOND H. REISS.
PAUL R. T. HAHN.

No references cited.